Dec. 1, 1931.  F. I. LAUTER  1,834,064
TIME CONTROL FOR BREAD TOASTERS AND THE LIKE
Filed Jan. 18, 1929  3 Sheets-Sheet 1
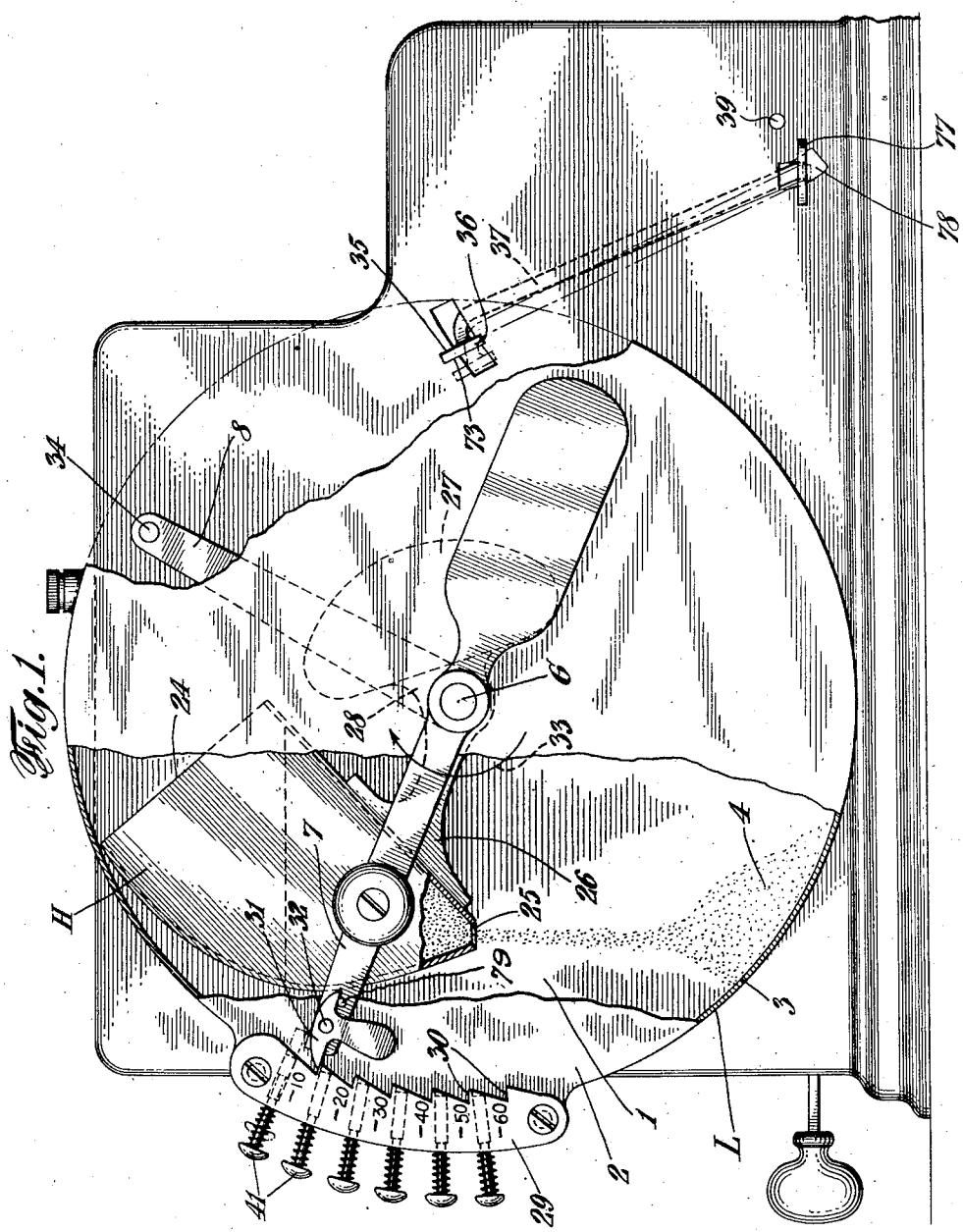

Dec. 1, 1931.  F. I. LAUTER  1,834,064
TIME CONTROL FOR BREAD TOASTERS AND THE LIKE
Filed Jan. 18, 1929  3 Sheets-Sheet 2
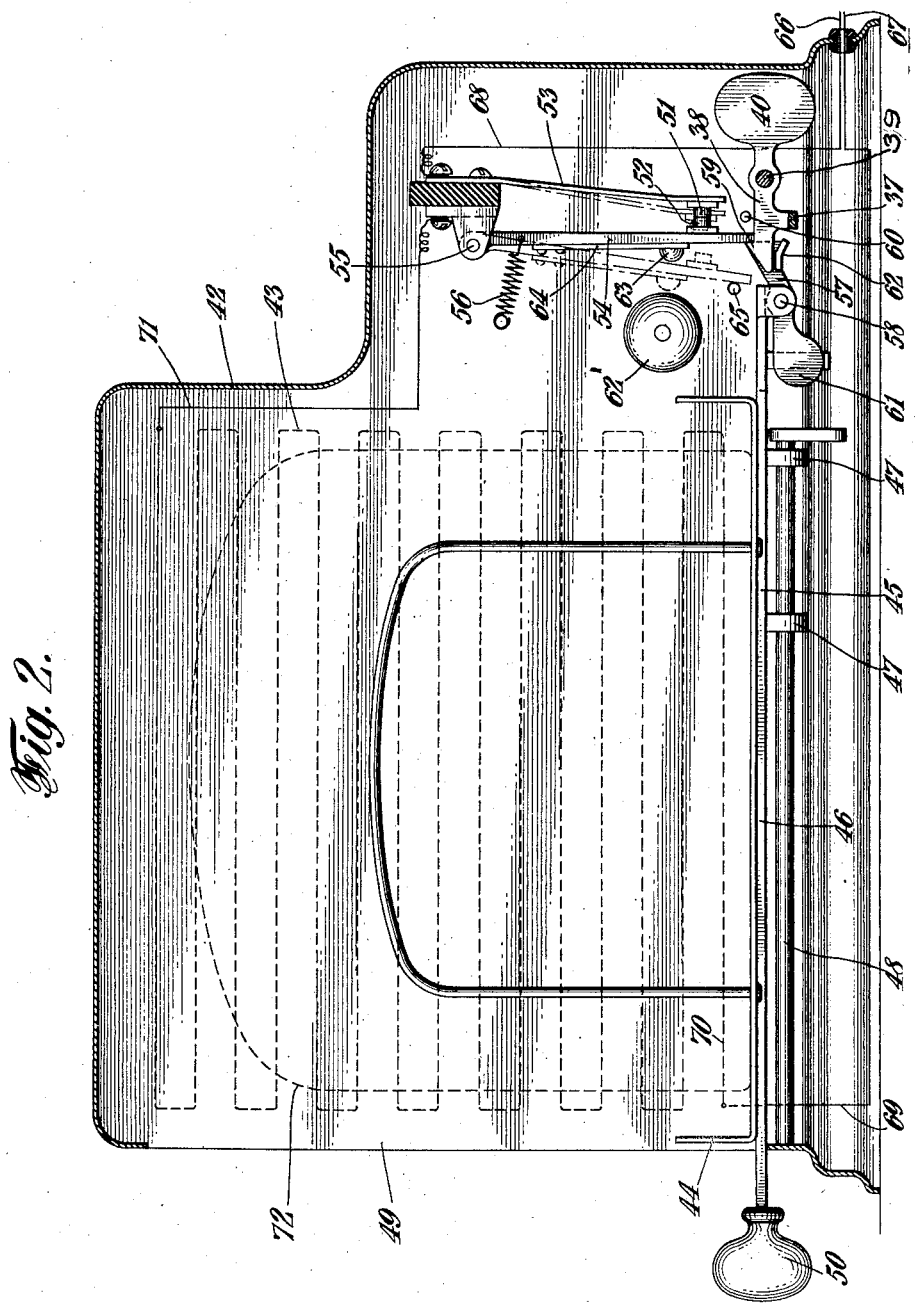

Dec. 1, 1931.  F. I. LAUTER  1,834,064
TIME CONTROL FOR BREAD TOASTERS AND THE LIKE
Filed Jan. 18, 1929  3 Sheets-Sheet 3
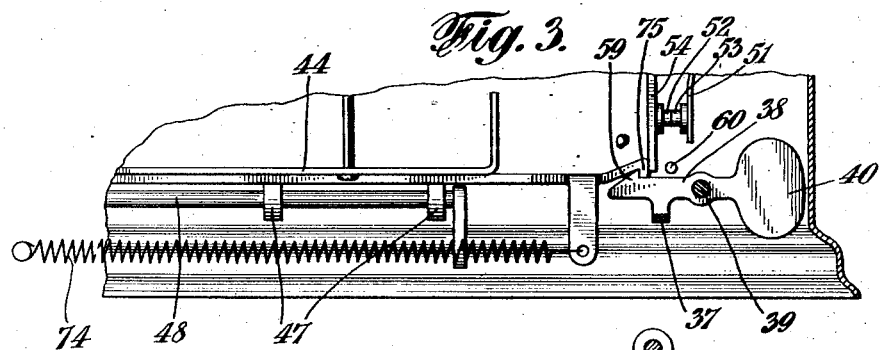
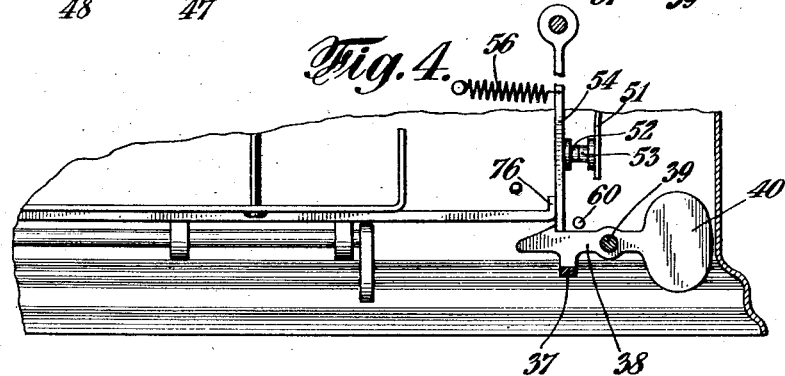
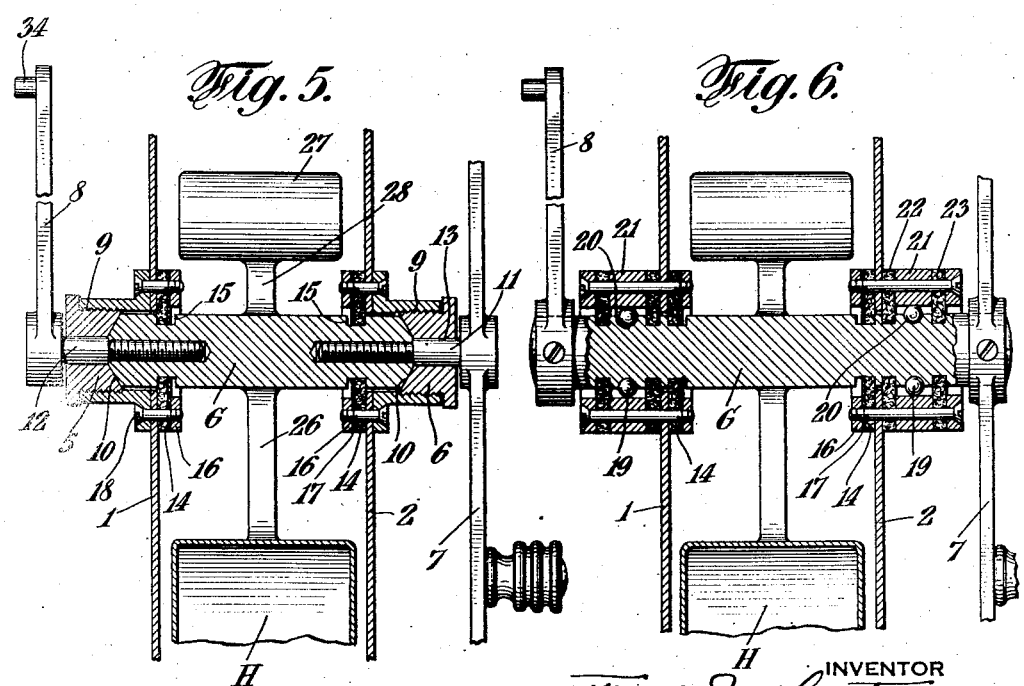

Patented Dec. 1, 1931

1,834,064

UNITED STATES PATENT OFFICE

FRED I. LAUTER, OF NEW YORK, N. Y.

TIME CONTROL FOR BREAD TOASTERS AND THE LIKE

Application filed January 18, 1929. Serial No. 333,346.

This invention relates to a time control for bread toasters or other devices, and an object of the invention is to provide a time control which will be simple, practical and efficient, and which may be manufactured at small cost.

A further object is to provide a time control including novel means by which the time period may be easily and conveniently altered at will.

A further and more detailed object is to provide a time control including a funnel like scoop arranged in a casing and operable from without the casing for dipping up a quantity of weighty material, such as fine dry sand, water, oil or the like, so that said material may drain through the open bottom of the scoop until such time as a counterweight is enabled to swing the scoop for performing work.

A further object is to provide a time control which may be mounted upon or formed as a part of an electric bread toaster or the like and which when so arranged may cause the circuit of said toaster to be broken at the end of a predetermined period.

A further object is to provide an electric bread toaster having means by which to automatically close the circuit upon introduction of bread thereinto and having the novel time control hereof associated therewith to break the circuit at the end of a predetermined adjustable period.

A further object is to provide simple and efficient means for indicating to the operator the fact that the toasting operation has been completed.

A more detailed object is to provide a toaster including an electric contact member movable into circuit closing position by insertion of bread to be toasted and movable automatically to break the circuit and sound a bell or otherwise operate a suitable signal device at the completion of the toasting period.

A further detailed object is to provide means whereby the bread will be agitated as a signal to the operator at the time when the circuit is broken.

A further object is to provide novel and efficient bearings for parts of the time control.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a side elevational view of a time control constructed in accordance with this invention, said control being shown in association with a bread toasting device, and parts being broken away for illustrating the interior construction.

Fig. 2 is a vertical longitudinal sectional view through the bread toaster shown in Fig. 1 for illustrating the arrangement of parts thereof associated with the time control.

Fig. 3 is a fragmentary detail view corresponding with a portion of Fig. 2 but illustrating a modified construction of parts thereof.

Fig. 4 is a view similar to Fig. 3 but illustrating a further modified construction of parts.

Fig. 5 is a detail sectional view through the centre bearing of the time control shown in Fig. 1, and Fig. 6 is a view similar to Fig. 5 but illustrating a modified form of bearing.

Referring to the drawings for describing in detail the structure illustrated therein, the reference character L indicates a cylindrical drum-shaped casing made of opposite side walls 1 and 2 and an annular marginal wall 3, said casing being adapted to contain a quantity of suitable flowable material 4, such as fine dry sand, water, oil or the like.

Through the axial centre of this casing extends a shaft G rotatably mounted in opposite bearing members 5 and 6 carried by the casing. An operating handle 7 is fixed to one end of the shaft G and a laterally extending arm 8 is fixed to the opposite end of said shaft both said handle and arm being exteriorly of the casing.

The bearing members 5 and 6 for the shaft G are preferably formed separate from the casing and have threaded engagement therewith as at 9—9 so that they are adjustable toward and away from each other. The inner surfaces of these bearing members are cone-shaped as at 10—10 to abut against mating cone surfaces provided upon the opposite ends of the shaft G, the shaft being thus supported by opposing cone bearings which are adjustable to take up wear etc.

The handle 7 is carried upon an extension 11 from one end of the shaft while the arm 8 is carried upon a similar extension 12 at the opposite end of the shaft both of said extensions projecting through loose openings as 13 provided for the purpose through the bearings 5—6.

The extensions 11 and 12 may be conveniently connected with the shaft G by being threaded thereinto as indicated.

The cone bearings 10—10 are by this arrangement placed outside of the casing so as to be thereby suitably removed from the contents of the casing, it being particularly noted that where said contents consists of sand such contents would be detrimental to the bearings.

To further insure against any of the contents of the casing reaching the bearings suitable guard means may be provided such as the felt washers 14—14 shown. These may be received within annular grooves 15—15 of the shaft so as to have firm rubbing contact against the walls of the grooves as shown and thus prevent migration of any of the casing contents to the end of the shaft.

Metallic washers 16 may be employed for holding the felt washers in place and firmly against the walls of the casing, and thin metallic members as 17 may be interposed between the felt washers and the washers 16 for extending into the grooves 15 to assist in holding the felt washers against the walls of the grooves. Fastening screws as 18—18 may be employed for holding all of these parts connected with the casing.

A modified form of bearing is illustrated in Fig. 6, wherein balls as 19—19 are employed in lieu of the cone bearings of Fig. 5. The shaft G is provided with ball races as 20—20 for receiving the balls, and external bearing members as 21—21 are connected with the casing beyond the side walls 1 and 2 of the casing for co-operating with these balls, the handle 7 and arm 8 being in this instance carried directly by the shaft which projects entirely through the bearings 21 for this purpose as indicated. This arrangement contemplates the use of felt washers 14, and parts 16 and 17 as in the structure Fig. 5, and suggests further the use of additional felt washers as 22 and 23 exteriorly of the casing one at each side of the ball race for assisting in the protection of the balls.

Carried by the shaft G within the casing is a funnel like scoop as H wide open at one end as at 24 and having a small opening as 25 at its lower end for the discharge of its contents somewhat in the manner common to an ordinary hour glass. This scoop is connected with the shaft by a stiff bracket arm 26.

Carried also by the shaft within the casing is a counterweight 27 for the scoop, the counterweight being connected with the shaft as by a stiff bracket arm 28.

Exteriorly of the casing there is provided a scale piece 29 notched to provide a series of shelves 30—30 therein concentric with the centre of shaft G adapted to be engaged by a finger 31 pivotally mounted as at 32 upon the end of the handle 7, it being intended that the handle may be manually moved to swing the shaft G, and hence the scoop and counterweight, around for scooping up a quantity of material 4 and then holding the scoop suspended within the casing at any desired point according to which of the shelves 30—30 the finger 31 is brought to rest upon, it being noted that the direction of movement of the scoop is always clock-wise, that is as indicated by the arrow 33.

The weight of the scoop and its contents will be supported at least in part against contro-clock-wise movement by the shelf and this support will continue as long as there is any tendency for the scoop to move in a contra-clock-wise direction, that is until so much of the contents of the scoop has flowed out through the opening 25 as will reduce the weight of the scoop to a point where the counterweight 27 will become effective to lift the scoop in a clock-wise direction away from its supporting shelf. A slow lifting movement of the scoop will occur as the material continues to flow outwardly through opening 25 and the scoop meanwhile approaches a position above the shaft. The counterweight thereupon becomes effective to swing the scoop, and particularly the arm 8, quickly around for performing any desired tripping or other like work.

In the instance illustrated the arm 8 carries a lateral finger 34 which engages the front surface 35 of a small plate 36, said plate being carried by an arm 37 which is connected with a latch 38 pivotally mounted as at 39 and urged to a normal position by a counterweight 40.

It will be understood from the above, together with the illustration Fig. 1, that the clock-wise movement of the scoop under the gravity pull of the counterweight will begin relatively sooner from the topmost shelf 30 illustrated than from the lowermost shelf. This is due to several causes primarily amongst which is the relative angular arrangement of the scoop and its counterweight with respect to the shaft as illustrated. This angular arrangement is such that when the scoop is in its low position it is approximately in the horizontal plane of the axial centre in shaft G and has consequent relatively great gravity pull, while the counterweight is more nearly vertical above said axis and has a relatively reduced gravity pull. When the scoop is brought by the handle to rest upon one of the higher shelves it is of course nearer the vertical, while the counterweight is by the same movement brought to a position nearer its maximum gravity pulling horizontal position.

The several steps 30 may be conveniently marked with legends as —10—, —20—, —30—, —40—, —50— and —60— to denote the number of seconds or minutes etc. which will elapse between the time when the scoop, that is the finger 31, is brought to rest upon a given shelf and the time when the tripping action will occur.

A series of stop devices as 41—41 may be provided associated with the shelves 30—30 respectively of the scales piece 29 said stop devices being operable to arrest the clockwise movement of arm 7 at any selected point. The stop devices 41 may be spring controlled to stand normally in a non-stopping position, and when an operator desires to operate the handle 7 he will first press one or the other of the devices 41 according to the operating time period desired, and thereupon bring the handle clock-wise around to abut against the stop. The finger 31 will thus be brought to rest upon the desired shelf in accordance with the stop which has been operated. The stop may now be allowed to return under its own spring pressure to non-stopping position so that at the end of the time period the handle may continue its clock-wise movement for effecting the tripping operation of arm 37 as above referred to.

The bread toasting structure, illustrated particularly in Fig. 2, consists of a suitable housing 42 within which is arranged an electric heating element 43 of appropriate design. Adjacent the element 43 is a toast holder 44 supported upon a carriage 45 the latter including a horizontal plate 46 having a pair of guides 47—47 thereon slidable along one or more guide rods 48 carried by the housing so that the toast holder may be slid into and out of the housing at will through an opening 49 at one end of the housing.

An operating handle as 50 is attached to one end of the plate 46 by which to manually move it into and out of the housing.

Within the housing adjacent the inner end of the plate 46 is a pair of contact members 51 and 52, the former being carried upon a spring support 53 which urges it toward the latter, and the latter being carried upon an arm 54 pivotally mounted as at 55 to swing its contact into and out of engagement with the former.

A suitable tension spring 56 is provided for urging the arm 54 normally to circuit breaking position.

A pusher finger 57 pivotally mounted as at 58 upon the inner end of the plate 46 is arranged to engage the arm 54 for moving said arm to circuit closing position whenever the plate 46 is moved home within the housing, and the latch member 38 has a hooked end portion 59 to engage the arm 54 for holding it in its circuit closing position until such time as said latch is moved by the finger 34 of the time control device as above described.

A stationary stop as 60 may be provided for limiting movement of the latch 38 under force of the weight 40 at all times.

The pusher finger 57 is counterweighted as at 61 so as to hold said finger normally in a position for engaging the lower end portion of arm 54. It carries a lateral projection 62 at its outer end adapted to slide into a position beneath the adjacent end of the latch 38 when the plate 46 is moved against the arm 54 so that thereafter when the latch 38 is moved to disengage the arm said latch 38 will press downwardly against the projection 62 and thus also cause the pusher finger to be swung for releasing the arm 54. Thus, whenever the latch 38 is operated by the time control the switch arm 54 will be fully released so that it may instantly snap, under tension of spring 56, into circuit breaking position, as indicated by the dotted lines in Fig. 2, leaving the toast holder 44 to be withdrawn by handle 50 at the will of the operator.

It is to be noted that the pusher finger 57 is free to swing downwardly about its pivot, and against the pressure of its counterweight 61 for permitting easy passage of the finger outwardly beneath the arm 54 upon withdrawal of the toast holder.

As an audible signal to the operator that the toasting operation has been completed the present invention proposes that a small bell as 62' may be arranged adjacent the switch arm 54, and that said switch arm may be provided with a clapper 63 disposed for engaging and sounding the bell whenever the switch arm is released. This clapper may be carried at one end of a leaf-spring 64 which is attached by its opposite end to the switch arm so that the clapper may be free to bound away from the arm and strike the bell in an approved manner, a stationary stop as 65 being provided for engagement by the switch arm for definitely arresting movement of said arm in circuit breaking direction.

The purpose of mounting the switch contact 51 upon a resilient support may now be understood, namely that in addition to providing for rubbing engagement with its mate it will enable the switch arm 54 to be pressed back by the toaster handle 50 sufficiently far to insure positive engagement of the switch arm with the hook of the latch 38, while maintaining good electric contact.

The electric circuit illustrated includes a pair of mains as 66 and 67.

From the main 66 a wire 68 leads to the spring support 53 and contact 51.

From the main 67 a wire 69 leads to one end of the heating element 70. From the opposite end of the heating element a wire 71 leads to the pivoted switch arm 54 and contact 52.

In operation, the operator having withdrawn the toast holder 44, having placed thereon a piece of toast, as indicated at 72, and having pressed a selected stop 41 and swung the handle 7 clock-wise against said stop, slides the holder again into the housing. The pusher finger 57 carried by the toast holder will press the switch arm 54 backwardly behind the hook of latch 38 and thus complete the circuit through the heating element 70. The parts will stand in this condition while the contents of the scoop H is gradually falling through the opening 25 of the scoop. When the contents of the scoop has become sufficiently depleted the counterweight 27 will operate to carry the finger 34 of arm 8 with a quick action against the surface 35 of the arm 37 and thus move the latch 38 and pusher finger 57 out of engagement with the switch arm 54 so that the spring 56 will instantly snap the switch open and at the same time sound the signal bell 62' notifying the operator that the current has been broken and the toast is ready for removal.

It is noted at this point that if through inadvertence or otherwise the handle 7 should be swung in a contra-clock-wise direction at any time the finger 34 of arm 8 in passing the arm 37 will simply strike against the relatively under face as 73 of the plate 36 causing the plate to be pressed upwardly a slight distance sufficient to allow the finger to pass, the arm 37 being amply flexible to permit this movement of the plate 36 without injury of any kind to the mechanism.

In the modification illustrated in Fig. 3 it is suggested that a tension spring as 74 may be employed if desired for automatically moving the toast holder outwardly of the housing whenever the time control releases the latch 38. The structure shown in Fig. 3 therefore contemplates that the toast holder may be provided with a hook extension as 75 rigid therewith at its inner end in lieu of the pusher finger 57, said hook extension being arranged to be caught by the hook 59 of the latch whenever the toast holder is pushed home against the tension of spring 74.

The switch arm 54 in this case is engaged only by the extension 75 of the toast holder so that it may move ot circuit breaking position whenever the toast holder is released from the latch 38.

In the modification illustrated in Fig. 4 it is suggested that if desired the spring 56 by which the switch arm 54 is operated may be utilized as a means for agitating or at least partly discharging the toast holder whenever the time control releases the latch 38. The structure shown in Fig. 4 therefore contemplates that the latch 38 shall have engagement only with the switch arm 54, being entirely free of engagement with the toast carrier, the latter merely having an upstanding portion 76 for abutting against the switch arm to move it to circuit closing position engaging the hook of the latch as indicated. By this arrangement, whenever the latch is released, as by the time control, the switch arm 54 will be instantly freed so that the tension of spring 56 will be exerted against the toast holder for agitating or moving said holder to a sufficient extent to thereby signal or indicate to the operator the fact that the current has been broken and the toast is ready for removal.

Obviously the signal bell 62' and its clapper 63 may be utilized in connection with either of the structures Figs. 3 or 4 if so desired.

If for any reason the operator should wish to break the circuit through the heating element independently of the operation of the time control this may be readily accomplished by simply pressing downwardly upon a small finger piece as 77 which comprises a part of the arm 37 and which projects through a suitable opening as 78 of the housing 42 so as to be conveniently accessible from without said housing.

It will be understood of course that if preferred however the finger piece 77 may be omitted and disengagement of the latch 38 be effected by positive manual movement of the handle 7 clock-wise at any time desired by the operator for causing the extension 34 to release the latch in substantially the same manner as though the extension 34 had been automatically operated at the completion of a time period as heretofore described. In fact the manual clock-wise movement of handle 7 for causing release of latch 38 need be carried only to the extent of moving the scoop 25 to a substantially vertical position above its carrying shaft G, whereupon the gravity weight 27 will be effective to complete downward movement of the extension 34 to trip the latch.

It has heretofore been mentioned that in operating the handle 7 it is simply necessary to first press a selected stop 41 and bring the handle to abut against said stop, and in this connection it is desired to add that a very important advantage of the presence of said stops is that they relieve the operator of necessity for excessive care when lifting the handle to a desired shelf or position. The finger 31 is provided with a stop 79 restraining it against pivotal movement in one direction and hence preventing any contra-clockwise movement of the handle 7 from one shelf 30 backward to another lower shelf. If an operator desiring to set the handle say on the lowermost shelf 30 should inadvertently move it to a relatively higher shelf he could correct the mistake only by full rotation of the handle about the shaft G. By using the stop 41 associated with the lowermost shelf it will be impossible for such a mistake to occur.

As many changes could be made in this construction without departing from the scope of the invention, as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. A time control device comprising a cylindrical casing adapted to contain a quantity of flowable material, a horizontally arranged shaft journaled axially of said casing, a funnel-like scoop carried by said shaft to rotate about the axis thereof having a relatively large opening at one end for scooping up the contents of the casing and having a relatively smaller opening at its opposite end for discharging said contents, means by which to rotate the shaft from without the casing for performing the scooping operation, means automatically operable to further rotate the shaft at a time dependent upon the flow of material from the scoop, an element to be actuated by movement of said shaft, and connections by which said element will be actuated co-incident with the mentioned further rotation of the shaft.

2. A time control device comprising a casing adapted to contain a quantity of flowable material, a funnel-like scoop having a relatively large opening at one end for scooping up the contents of the casing and having a relatively smaller opening at its opposite end for discharging said contents, means operable from without the casing for performing the scooping operation, an element to be actuated, and connections between said element and the scoop whereby to actuate said element at a time dependent upon the flow of material from the scoop.

3. A time control device comprising a cylindrical casing adapted to contain a quantity of flowable material, a horizontally arranged shaft journaled axially of said casing, a funnel-like scoop fixed to said shaft to rotate therewith having a relatively large opening at one end for scooping up the contents of the casing and having a relatively smaller opening at its opposite end for discharging said contents, a handle arranged exteriorly of the casing fixed to the shaft by which to rotate the shaft, means arranged to be engaged by the handle to support the shaft and scoop in position so that material will discharge from the smaller end of the scoop, a counterweight for rotating the shaft and scoop at a time dependent upon the flow of material from the scoop, an element to be actuated by movement of said shaft, and connections by which said element will be actuated co-incident with rotation of the shaft by the counter-weight.

4. A time control device comprising a cylindrical casing adapted to contain a quantity of flowable material, a horizontally arranged shaft journaled axially of said casing, a funnel-like scoop fixed to said shaft to rotate therewith having a relatively large opening at one end for scooping up the contents of the casing and having a relatively smaller opening at its opposite end for discharging said contents, a handle arranged exteriorly of the casing fixed to the shaft by which to rotate the shaft, means providing a series of shelves spaced apart circumferentially about the axis of the shaft selectively engageable by the handle to support the shaft and scoop in any one of a plurality of selected positions so that material will discharge from the smaller end of the scoop, a counterweight for rotating the shaft and scoop at a time dependent upon the flow of material from the scoop, an element to be actuated by movement of said shaft, and connections by which said element will be actuated co-incident with rotation of the shaft by the counterweight.

5. A time control device comprising a cylindrical casing adapted to contain a quantity of flowable material, a horizontally arranged shaft journaled axially of said casing, a funnel-like scoop fixed to said shaft to rotate therewith having a relatively large opening at one end for scooping up the contents of the casing and having a relatively smaller opening at its opposite end for discharging said contents, a handle arranged exteriorly of the casing fixed to the shaft by which to rotate the shaft, means providing a stop normally out of the path of movement of the handle but being manually movable into the path of the handle to arrest movement of the handle, a shelf arranged to be engaged by the handle when the handle engages said stop adapted to support the shaft and scoop in position so that material will discharge from the smaller end of the scoop, a counterweight for rotating the shaft and scoop at a time dependent upon the flow of material from the scoop, an element to be actuated by movement of said shaft, and connections by which said element will be actuated co-incident with rotation of the shaft by the counterweight.

6. A time control device comprising a cylindrical casing adapted to contain a quantity of flowable material, a horizontally arranged shaft journaled axially of said casing, a funnel-like scoop fixed to said shaft to rotate therewith having a relatively large opening at one end for scooping up the contents of the casing and having a relatively smaller opening at its opposite end for discharging said contents, a handle arranged exteriorally of the casing fixed to the shaft by which to rotate the shaft, means providing a series of shelves spaced apart circumferentially about the axis of the shaft selectively engageable by the handle to support the shaft and scoop in any one of a plurality of selected positions so that material will discharge from the smaller end of the scoop, means providing a series of stops normally out of the path of movement of the handle one associated with each of said shelves each being manually selectively movable into the path of the handle to arrest movement of the handle adjacent a selected shelf, a counterweight for rotating the shaft and scoop at a time dependent upon the flow of material from the scoop, an element to be actuated by movement of said shaft, and connections by which said element will be actuated co-incident with rotation of the shaft by the counterweight.

In testimony whereof I affix my signature.

FRED I. LAUTER.